United States Patent Office 2,794,807
Patented June 4, 1957

2,794,807
PYRIDYL DERIVATIVES

John Krapcho, New Brunswick, N. J., assignor to Olin Mathieson Chemical Corporation, New York, N. Y., a corporation of Virginia No Drawing. Application April 9, 1956,
Serial No. 576,791

13 Claims. (Cl. 260—297)

This invention relates to new pyridyl derivatives and more particularly to pyridinium salts of the general formula

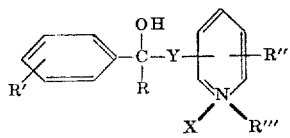

wherein R is lower alkyl of at least two carbon atoms, phenyl or thienyl (preferably lower alkyl, such as ethyl, propyl, isopropyl, butyl, isobutyl, sec-butyl, and tert-butyl), R' and R" are hydrogen, halogen (particularly chloro), lower alkyl, or lower alkoxy, R''' is lower alkyl or benzyl, X is a non-toxic anion (particularly halogen); and Y is a lower alkylene of at least two carbon atoms, the chain of which may be straight or branched (preferably trimethylene).

The compounds are most advantageously prepared by the process of this invention, wherein a compound of the formula

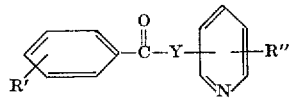

wherein R' and R" are as hereinbefore defined, is reacted with a Grignard of the formula RMgBr, wherein R is as above defined (preferably in an anhydrous ether solvent) and the resultant pyridine compound of the formula

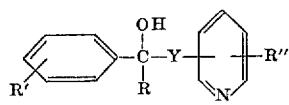

wherein R, R', and R" are as hereinbefore defined, is quaternized with a compound of the formula R'''X (preferably in an organic solvent), R''' and X being as hereinbefore defined.

The pyridinium salts of this invention are useful both as antispasmodics and antisecretory agents, and thus may be administered perorally in the same manner as atropine and methantheline bromide, respectively, in the treatment of Parkinsonism and gastrointestinal disorders (peptic ulcers), respectively; the dosage thereof being adjusted for the relative activity of the particular compound.

The following examples illustrate the invention (all temperatures being centigrade):

EXAMPLE 1

2-(4-hydroxy-4-isopropyl-4-phenylbutyl)-1-methylpyridinium bromide (a) PREPARATION OF α-ISOPROPYL-α-PHENYL-2-PYRIDINEBUTANOL To a solution of isopropyl magnesium bromide, prepared from 24.3 g. of magnesium turnings, 100 g. of isopropyl bromide and 300 ml. of ether, is added 98.0 g. of 3-(2-pyridyl)-propyl phenyl ketone [J. A. C. S. 72, 5008 (1950)] in 100 ml. of ether. A gray precipitate separates from solution. After refluxing for eight hours, the reaction mixture is poured into a cold solution of 80 g. of ammonium chloride in 250 ml. of water. The upper layer is separated and the aqueous phase extracted with ether. The combined ether layers are washed with two 200 ml. portions of 5% ammonium chloride, 200 ml. of water, and dried over magnesium sulfate. After evaporation of the solvent, the product is distilled; yield about 100.5 g. B. P. 150–152° (0.3 mm.). The pale yellow distillate slowly crystallizes; M. P. 46–48°.

(b) PREPARATION OF α-ISOPROPYL-α-PHENYL-2-PYRIDINEBUTANOL, SALT WITH MALEIC ACID

A solution of 38.4 g. of the material from part (a) in 50 ml. of ethyl acetate is added to a suspension of 19.2 g. of maleic acid in 100 ml. of warm ethyl acetate. After cooling the resulting solution, the product crystallizes, yield about 44.0 g., M. P. 95–96°. Recrystallization of 51.0 g. of this product from 170 ml. of ethyl acetate yields about 46.6 g. of colorless product; M. P. 96–97°.

(c) PREPARATION OF 2-(4-HYDROXY-4-ISOPROPYL-4-PHENYLBUTYL)-1-METHYLPYRIDINIUM BROMIDE

A suspension of 26.0 g. of material from part (b) in 100 ml. of water is treated with a solution of 20 g. of potassium carbonate in 40 ml. of water. The liberated base (colorless solid) is extracted with ether and dried over magnesium sulfate. After evaporation of the solvent, the residue is dissolved in 100 ml. of acetone and treated with 14.2 g. of methyl bromide in 29 ml. of acetone. The reaction mixture is allowed to stand at room temperature for two days, filtered, and the precipitate is dried, yield about 17.7 g., M. P. 132–133° (s. 121°). After recrystallization from 40 ml. of acetonitrile—40 ml. of acetone, the colorless product weighs about 15.3 g., M. P. 134–135° (s. 121°).

EXAMPLE 2

2-(4-ethyl-4-hydroxy-4-phenylbutyl)-1-methylpyridinium bromide (a) PREPARATION OF α-ETHYL-α-PHENYL-2-PYRIDINEBUTANOL Replacement of ethyl bromide for the isopropyl bromide in part (a) of Example 1 gives the product which is purified by distillation, B. P. 159–161° (0.7 mm.).

(b) PREPARATION OF 2-(4-ETHYL-4-HYDROXY-4-PHENYLBUTYL)-1-METHYLPYRIDINIUM BROMIDE

A solution of 30.5 g. of material from part (a) is dissolved in 100 ml. of acetone and treated with a solution of 23.8 g. of methyl bromide in 41 ml. of acetone. After standing at room temperature for several days, the product is filtered and dried; yield about 39.0 g., M. P. 138–140°. This material (about 44 g.) is recrystallized from 120 ml. of isopropyl alcohol, yield about 40.0 g., M. P. 140–142°.

EXAMPLE 3

2-(4-hydroxy-6-methyl-4-phenylheptyl)-1-methylpyridinium bromide (a) PREPARATION OF α-ISOBUTYL-α-PHENYL-2-PYRIDINEBUTANOL Replacement of the isopropyl bromide in part (a) of Example 1 by isobutyl bromide gives the isobutyl analog of the product of Example 1, which is purified by distillation, B. P. 158–160° (0.1 mm.).

(b) PREPARATION OF 2-(4-HYDROXY-6-METHYL-4-PHENYLHEPTYL)-1-METHYLPYRIDINIUM BROMIDE

A solution of 22.6 g. of material from part (a) in 50 ml. of acetone is treated with 13.3 g. of methyl bromide, dissolved in 27 ml. of acetone. After standing several days at room temperature, the mixture is cooled. The mother liquor is decanted from the pale yellow semi-solid and the latter crystallized from 40 ml. of acetonitrile, yield about 11.8 g. M. P. 151–155°. This material is recrystallized from 40 ml. of acetonitrile to yield about 10.9 g. of colorless product, M. P. 158–160°.

EXAMPLE 4

*2-(4-hydroxy-4-phenyldecyl)-1-methylpyridinium bromide*

(a) PREPARATION OF α-N-HEXYL-α-PHENYL-2-PYRIDINEBUTANOL

Use of n-hexyl bromide in place of isobutyl bromide in part (a) of Example 1 gives the n-hexyl analog which is purified by crystallization from hexane, M. P. 71–72°.

(b) PREPARATION OF 2-(4-HYDROXY-4-PHENYL-DECYL)-1-METHYLPYRIDINIUM BROMIDE

A solution of 10.0 g. of material from part (a) in 25 ml. of acetone is treated with a solution of 6.9 g. of methyl bromide in 14 ml. of acetone. After standing for two days at room temperature, the solution is diluted with 50 ml. of ether to yield a colorless precipitate, yield about 11.3 g., M. P. 118–119.5°. This material was recrystallized from 30 ml. of butanone, yield 10.3 g., M. P. 118–119.5°.

EXAMPLE 5

*2-(4-hydroxy-4,4-diphenylbutyl)-1-methylpyridinium bromide*

(a) PREPARATION OF α,α-DIPHENYL-2-PYRIDINE-BUTANOL

Interaction of phenylmagnesium bromide with 3-(2-pyridyl)-propyl phenyl ketone according to the procedure described under part (2) of Example 1 gives the ether insoluble product which is purified by crystallization from butanone, M. P. 150–152°.

(b) PREPARATION OF 2-(4-HYDROXY-4,4-DIPHENYL-BUTYL)-1-METHYLPYRIDINIUM

A solution of 10 g. of the material from part (a) is dissolved in 80 ml. of warm chloroform, cooled to room temperature and treated with a solution of 9.5 g. of methyl bromide in 17 ml. of acetone. The product crystallizes after several hours. After standing for two days at room temperature, the product is filtered and dried; yield about 11.4 g., M. P. 185–186°.

EXAMPLE 6

*2-(4-hydroxy-4-isopropyl-4-phenylbutyl)-1-isopropyl-pyridinium bromide*

A suspension of 26.0 g. of maleate salt described in part (b) of Example 1 in 100 ml. of water is treated with a solution of 20 g. of potassium carbonate in 40 ml. of water. The liberated base is extracted with ether and dried over magnesium sulfate. After evaporation of the solvent, the residue is dissolved in 50 ml. of acetonitrile and treated with 50 g. of isopropyl bromide. The mixture is transferred into bomb tubes and heated at 100° for sixteen hours. After distillation of most of the solvent, the residue is diluted with ether to yield a pale brown solid, yield 8.9 g., M. P. 135–140°. This material is crystallized from a mixture of 15 ml. acetonitrile—15 ml. acetone and then from 30 ml. of acetonitrile. The resulting colorless solid weighs about 3.4 g., M. P. 179–181°.

EXAMPLE 7

*2-(4-hydroxy-4-isopropyl-4-phenylbutyl)-1-benzyl-pyridinium bromide*

Replacement of the isopropyl bromide in Example 6 by benzyl bromide gives the product above named, which is purified by crystallization from acetonitrile.

EXAMPLE 8

*2-[4-(2-chlorophenyl)-4-hydroxy-5-methylhexyl]-1-methylpyridinium bromide*

(a) PREPARATION OF 2'-CHLORO-4-(2-PYRIDYL)-BUTYROPHENONE

A solution of 4.8 g. of sodium in 26 ml. of absolute alcohol is treated with 289 g. of ethyl o-chlorobenzoylacetate, 120 g. of freshly distilled 2-vinyl-pyridine and 370 ml. of toluene and the mixture then stirred and refluxed for eight hours. The mixture is cooled and treated with a solution of 140 ml. of concentrated hydrochloric acid in 500 ml. of water. The aqueous layer is separated and the organic phase extracted with 140 ml. of water. The aqueous phases are combined and basified with a solution of 112 g. of sodium hydroxide in 225 ml. of water. The product is extracted with chloroform and the extract dried over magnesium sulfate. The solvent is evaporated and the residue (about 371.7 g.) then treated with a solution of 225 ml. of concentrated hydrochloric acid in 150 ml. of water. The mixture is refluxed for eight hours. About 80 ml. of distillate (mostly ethanol) is collected during this reflux period. The reaction mixture is cooled and treated portionwise with 350 ml. of concentrated ammonia water. The liberated base is extracted with ether and dried over magnesium sulfate. After evaporation of the solvent, the product is fractionated, yield about 210 g., B. P. 165–170° (0.5 mm.).

(b) PREPARATION OF ω-(2-CHLOROPHENYL)-ω-ISOPROPYL-2-PYRIDINEBUTANOL, HYDROCHLORIDE

Interaction of the material from part (a) with isopropylmagnesium bromide according to the procedure described under part (a) of Example 1 gives a syrupy yellow-orange liquid, B. P. 175–180° (1 mm.). This base (about 59.3 g.) is dissolved in 100 ml. of ether and treated with a slight excess of alcoholic hydrogen chloride. The solution is diluted to about 500 ml. with ether to give a semi-solid product. The mother liquor is decanted and the product suspended in 200 ml. of butanone and filtered, yield about 58.5 g., M. P. 150–170°. After two crystallizations from isopropyl alcohol, the colorless product melts at 185–187°.

(c) PREPARATION of 2-[4-(2-CHLOROPHENYL)-4-HYDROXY-5-METHYLHEXYL]-1-METHYLPYRIDINIUM BROMIDE

A solution of 15.0 g. of material from part (b) in 60 ml. of water is treated with a solution of 2.4 g. of sodium hydroxide in 10 ml. of water. The liberated base is extracted with ether and dried over magnesium sulfate. After evaporation of the solvent, the residue is dissolved in 40 ml. of acetone and treated with a solution of 9.5 g. of methyl bromide in 13 ml. of acetone. After standing for two days at room temperature, a considerable quantity of product crystallizes. The mixture is cooled, filtered and the product washed with acetone, yield about 16.1 g. M. P. 177–180°. The material is recrystallized from 70 ml. of acetonitrile to give about 12.5 g. of colorless product, M. P. 178–181°.

EXAMPLE 9

*2-[4-hydroxy-5-methyl-4-(4-methylphenyl)-hexyl]-5-ethyl-1-methylpyridinium bromide*

(a) PREPARATION OF 4-(5-ETHYL-2-PYRIDYL)-4'-METHYLBUTYROPHENONE

A mixture of 134 g. of p-methylacetophenone, 66.5 g. of 5-ethyl-2-vinyl-pyridine and 1.0 g. of sodium (in small pieces) is stirred and heated at 145–160° for five hours. The mixture is fractionated and the fraction which distills at 165–170° (0.3 mm.) is twice crystallized from hexane, M. P. 49–50°.

(b) PREPARATION OF 2-[4-HYDROXY-5-METHYL-4-(4-METHYLPHENYL)HEXYL]-1-METHYL-5-ETHYL-PYRIDINIUM BROMIDE

Interaction of the material from part (a) with isopropylmagnesium bromide according to the procedure described in part (a) of Example 1 gives ω-isopropyl-ω-(4-methylphenyl)-2-pyridinebutanol. Treatment of this product with methyl bromide in the usual manner gives the pyridinium compound.

EXAMPLE 10

5-ethyl-2-(4-hydroxy-4-isopropyl-4-phenylbutyl)-1-methylpyridinium bromide (a) PREPARATION OF 4-(5-ETHYL-2-PYRIDYL)-BUTYROPHENONE Sodium (3.5 g. in small pieces) is added to 768 g. of ethyl benzoylacetate and the mixture then heated to 160°. The solution is stirred and maintained at this temperature during the dropwise addition (three hours) of 266 g. of freshly distilled 5-ethyl-2-vinylpyridine. The mixture is heated for an additional three hours at this temperature, cooled and added slowly a solution of 200 ml. of concentrated hydrochloric acid in 600 ml. of water. The material is extracted twice with ether and the organic phase discarded. The aqueous portion is basified with a solution of 120 g. of sodium hydroxide in 200 ml. of water. The liberated base is extracted with ether and the combined ether extract washed with two 100 ml. portions of water and dried over magnesium sulfate. After evaporation of the solvent, the residue weighs about 616 g.

The major part of the above crude ester (560.3 g.) is added portionwise to a solution of 390 ml. of concentrated hydrochloric acid in 250 ml. of water. The mixture is slowly distilled, collecting 400 ml. of distillate during a period of eight hours. The residue is cooled and treated portionwise with 500 ml. of concentrated ammonia. The liberated base is extracted with ether and the ether extract washed twice with 200 ml. portions of water and dried over magnesium sulfate. After evaporation of the solvent, the product is fractionated, yield about 378 g. of pale yellow liquid, B. P. 171–173° (0.7 mm.).

(b) PREPARATION OF ω-ISOPROPYL-ω-PHENYL-(5-ETHYL-2-PYRIDINE)BUTANOL

Interaction of 110 g. of material from part (a) with isopropyl-magnesium bromide according to a procedure described in part (a) of Example 1 gives a product which is purified by crystallization of 300 ml. of hexane, yield about 87 g., M. P. 85–87°.

(c) PREPARATION OF 5-ETHYL-2-(4-HYDROXY-4-ISOPROPYL-4-PHENYLBUTYL)-1-METHYL-PYRIDINIUM BROMIDE

A solution of 17.0 g. of material from part (b) in 50 ml. of acetone is treated with a solution of 11.4 g. of methyl bromide in 20 ml. of acetone. After standing overnight at room temperature the solution is diluted with ether to yield an oil which on trituration with ether becomes a semi-solid. The latter is dissolved in 50 ml. of warm isopropyl alcohol and cooled. The resulting crystalline product rapidly separates from solution, yield about 19.6 g., M. P. 92–94°. This material contains one-half mole of solvent of crystallization.

EXAMPLE 11

2-(3-hydroxy-3,3-diphenylpropyl)-1-methylpyridinium bromide (a) PREPARATION OF 3-(2-PYRIDYL)PROPIOPHENONE To a solution of phenylmagnesium bromide prepared from 24.3 g. of magnesium, 157.0 g. of bromobenzene and 650 ml. of ether is added dropwise a solution of 113.8 g. of β-(2-pyridyl)propionitrile [J. A. C. S., 63, 2771 (1941)] in 100 ml. of ether. A heavy precipitate forms. After refluxing the mixture for three hours, 500 ml. of benzene is added dropwise during the same time in which an equal volume of ether is distilled. The resulting mixture is refluxed for four hours, cooled and poured onto a mixture of 250 ml. of concentrated hydrochloric acid and 400 ml. of water. The organic solvent is distilled and the residue refluxed for two hours, cooled and basified with concentrated ammonia water. The liberated base is extracted with ether and dried over magnesium sulfate. After evaporation of the solvent, the product distills a pale red oil, yield about 73.2 g. B. P. 146–147° (0.8. mm.).

(b) PREPARATION OF ω,ω-DIPHENYL-2-PYRIDINE-PROPANOL

A solution of 109.0 g. of material from part (a) in 300 ml. of ether is added dropwise to a stirring solution of phenylmagnesium bromide (prepared from 25.3 g. of magnesium turnings, 163.5 g. of bromobenzene and 650 ml. of ether). Cooling is not necessary during the addition. A yellow precipitate separates from the mixture. After refluxing for ten hours, the mixture is cooled and poured onto a solution of 280 g. of ammonium chloride in 1.4 l. of water. The organic layer is separated and the aqueous phase extracted with ether. The ether layers are combined and dried over magnesium sulfate. After evaporation of the solvent, the colored residue is treated with 300 ml. of hexane and cooled. The mixture partly solidifies and is filtered. The oil is pressed from the filter cake (about 96 g.) and the latter dissolved in 50 ml. of warm benzene and the solution diluted with 300 ml. of hexane. After cooling, the product is filtered and dried; yield about 68.5 g., M. P. 88–90°. This material is suspended in 500 ml. of boiling hexane and then cooled; yield about 65.5 g., M. P. 90–92°. After crystallization from 100 ml. of isopropyl alcohol, the solid weighs about 56 g., M. P. 96–97°. Subsequent crystallization from 120 ml. of isopropyl alcohol—60 ml. of hexane gives 45 g. of nearly colorless product, M. P. 106–109°. After recrystallization from isopropyl alcohol, the pure product melts at 109–110°.

(c) PREPARATION OF 2-(3-HYDROXY-3,3-DIPHENYLPROPYL)-1-METHYLPYRIDINIUM BROMIDE

A solution of 23.2 g. of material from part (b) in 200 ml. of acetone is treated with a solution of 19.0 g. of methyl bromide in 26 ml. of acetone. After standing for three days at room temperature, the colorless, crystalline product is filtered and washed with acetone; yield about 25.2 g., M. P. 228° (dec.).

EXAMPLE 12

2-[4-hydroxy-4-phenyl-4-(ω-thienyl)butyl]-1-methylpyridinium bromide (a) PREPARATION OF ω-PHENYL-ω-(2-THIENYL-2-PYRIDINEBUTANOL Interaction of ω-thienylmagnesium bromide with 3-(2-pyridyl)-propyl ketone according to the procedure described under part (a) of Example 1 gives a crystalline product.

(b) PREPARATION OF 2-[4-HYDROXY-4-PHENYL-4-(ω-THIENYL)BUTYL]-1-METHYL-PYRIDINIUM BROMIDE

A solution of 10 g. of material from part (a) is dissolved in 80 ml. of warm chlorofrom, cooled to room temperature and treated with a solution of 9.5 g. of methyl bromide in 17 ml. of acetone. The product crystallizes from the solution. After standing for several days at room temperature, the crystalline product is filtered and dried.

If the molar equivalent of the corresponding chloride (e. g. methyl chloride) or di(lower alkyl) sulfate (e. g., dimethyl sulfate) is substituted for the bromide (e. g. methyl bromide) in the procedure of the preceding examples, the corresponding chloride and methosulfate salts are formed respectively.

The invention may be variously otherwise embodied within the scope of the appended claims.

I claim:
1. A compound of the general formula

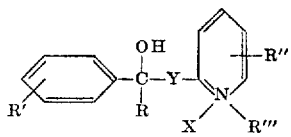

wherein R is selected from the group consisting of the lower alkyl of at least two carbon atoms, phenyl and thienyl; R' and R" are selected from the group consisting of hydrogen, halogen, lower alkyl and lower alkoxy; R''' is selected from the group consisting of lower alkyl and benzyl; X is a non-toxic anion; and Y is a lower alkylene of two to four carbon atoms.

2. A compound of the general formula

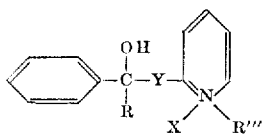

wherein R is a lower alkyl radical of at least two carbon atoms, R''' is lower alkyl, X is a non-toxic anion and Y is a lower alkylene of two to four carbon atoms.

3. A 2 - (4 - hydroxy - 4 - R - 4 - phenylbutyl) - 1 - (lower alkyl) pyridinium salt of a non-toxic anion, wherein R is a lower alkyl radical of at least two carbon atoms.

4. A compound of the general formula

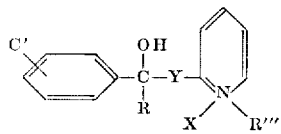

wherein R is a lower alkyl radical of at least two carbon atoms, R''' is lower alkyl, X is a non-toxic anion and Y is a lower alkylene of two to four carbon atoms.

5. A 2 - (4 - hydroxy - 4 - R - 4 - chlorophenylbutyl) - 1-(lower alkyl)pyridinium salt of a non-toxic anion, wherein R is a lower alkyl radical of at least two carbon atoms.

6. A compound of the general formula

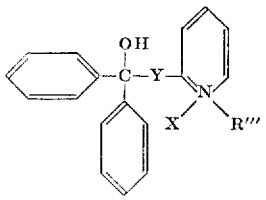

wherein R''' is lower alkyl, X is a non-toxic anion, and Y is a lower alkylene of two to four carbon atoms.

7. A 2 - (4 - hydroxy - 4,4 - diphenylbutyl) - 1 - (lower alkyl) pyridinium salt of a non-toxic anion.

8. A process for preparing compounds of the general formula

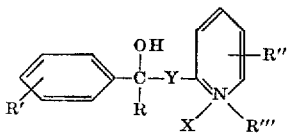

which comprises interacting a compound of the formula

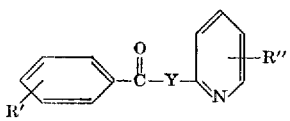

with a Grignard reagent of the formula RMgBr and interacting the resultant pyridine compound of the formula

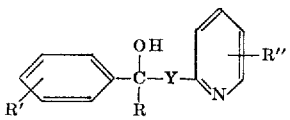

with a compound of the formula R'''X, wherein R is selected from the group consisting of lower alkyl of at least two carbon atoms, phenyl and thienyl; R' and R" are selected from the group consisting of hydrogen, halogen, lower alkyl and lower alkoxy; R''' is selected from the group consisting of lower alkyl and benzyl; X is a non-toxic anion; and Y is a lower alkylene of two to four carbon atoms.

9. 2 - (4 - hydroxy - 4 - isopropyl - 4 - phenylbutyl) - 1-methyl-pyridinium bromide.

10. 2 - (4 - hydroxy - 6 - methyl - 4 - phenylheptyl) - 1-methyl-pyridinium bromide.

11. 2 - (4 - hydroxy - 4,4 - diphenylbutyl) - 1 - methyl-pyridinium bromide.

12. 2 - [4 - (2 - chlorophenyl) - 4 - hydroxy - 5 - methylhexyl]-1-methylpyridinium bromide.

13. 2 - (3 - hydroxy - 3,3 - diphenylpropyl) - 1 - methylpyridinium bromide.

References Cited in the file of this patent

UNITED STATES PATENTS

| | | |
|---|---|---|
| 2,566,376 | Shelton et al. | Sept. 4, 1951 |
| 2,606,190 | Shelton et al. | Aug. 5, 1952 |
| 2,727,895 | Sperber et al. | Dec. 20, 1955 |
| 2,727,899 | Bernstein et al. | Dec. 20, 1955 |

UNITED STATES PATENT OFFICE

Certificate of Correction

Patent No. 2,794,807

June 4, 1957

John Krapcho

It is hereby certified that error appears in the printed specification of the above numbered patent requiring correction and that the said Letters Patent should read as corrected below.

Column 7, lines 30 to 35 inclusive, claim 4, the formula should appear as shown below instead of as in the patent—

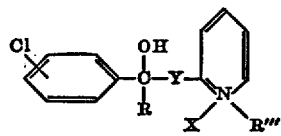

Signed and sealed this 15th day of October 1957.

[SEAL]

Attest:
KARL H. AXLINE,
*Attesting Officer.*

ROBERT C. WATSON,
*Commissioner of Patents.*